Aug. 3, 1965    G. E. PLATZER, JR., ETAL    3,198,070
REAR VIEW MIRROR CONTAINING A FLUID LIGHT CONTROLLING MEDIUM
Filed Dec. 1, 1961    5 Sheets-Sheet 5
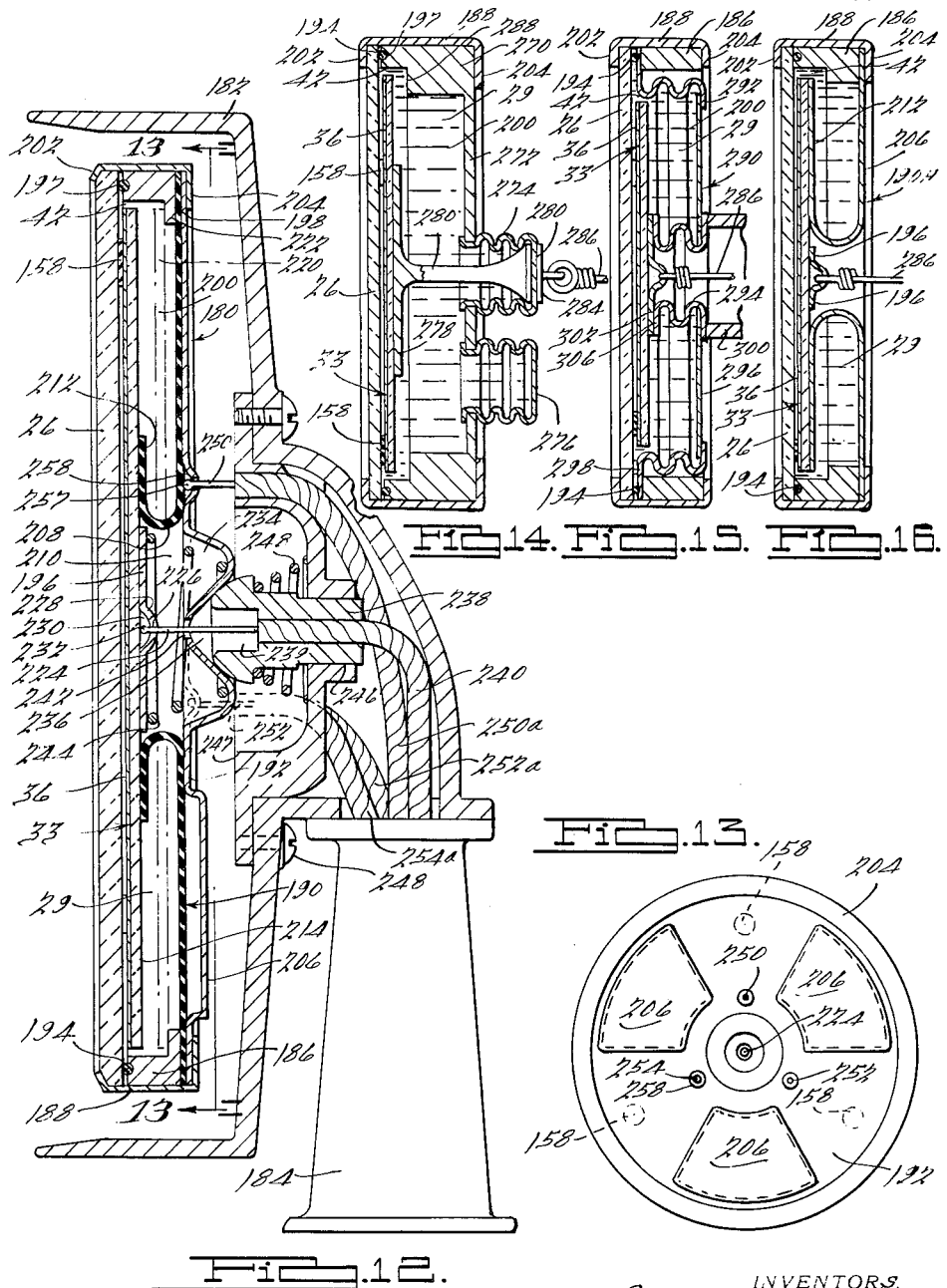
INVENTORS.
George E. Platzer, Jr.
Leonard P. Gau.
BY
Harness & Harris
ATTORNEYS.

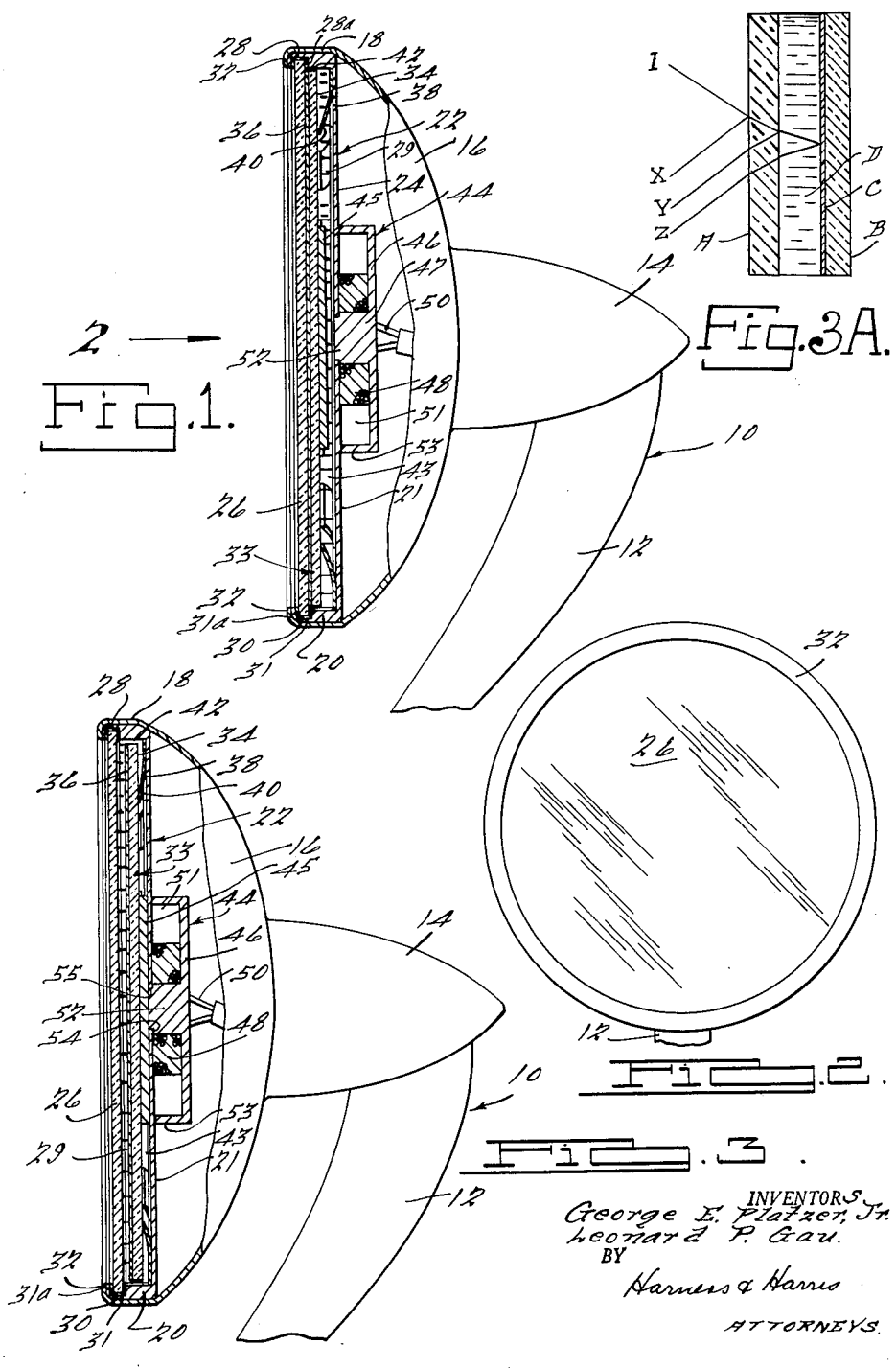

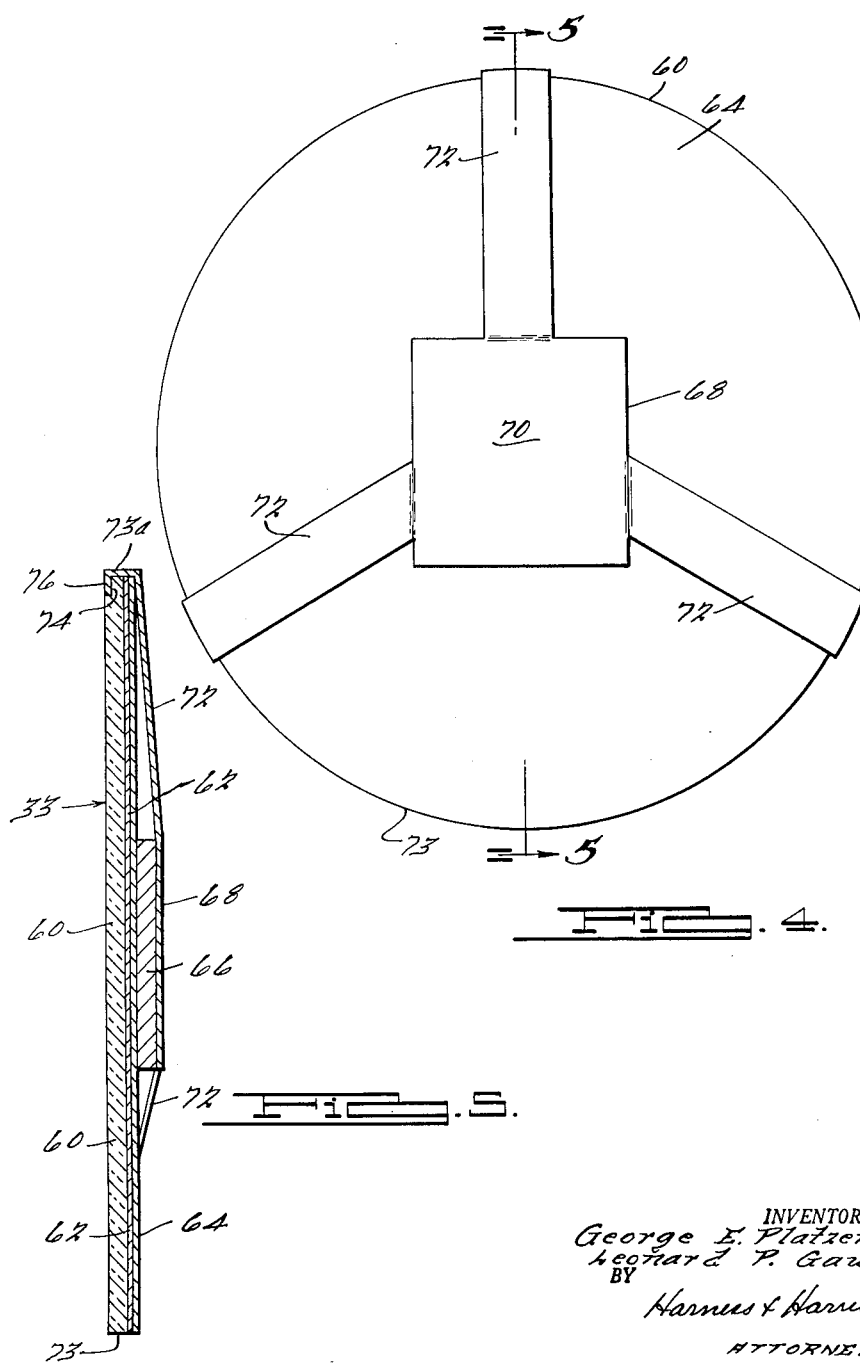

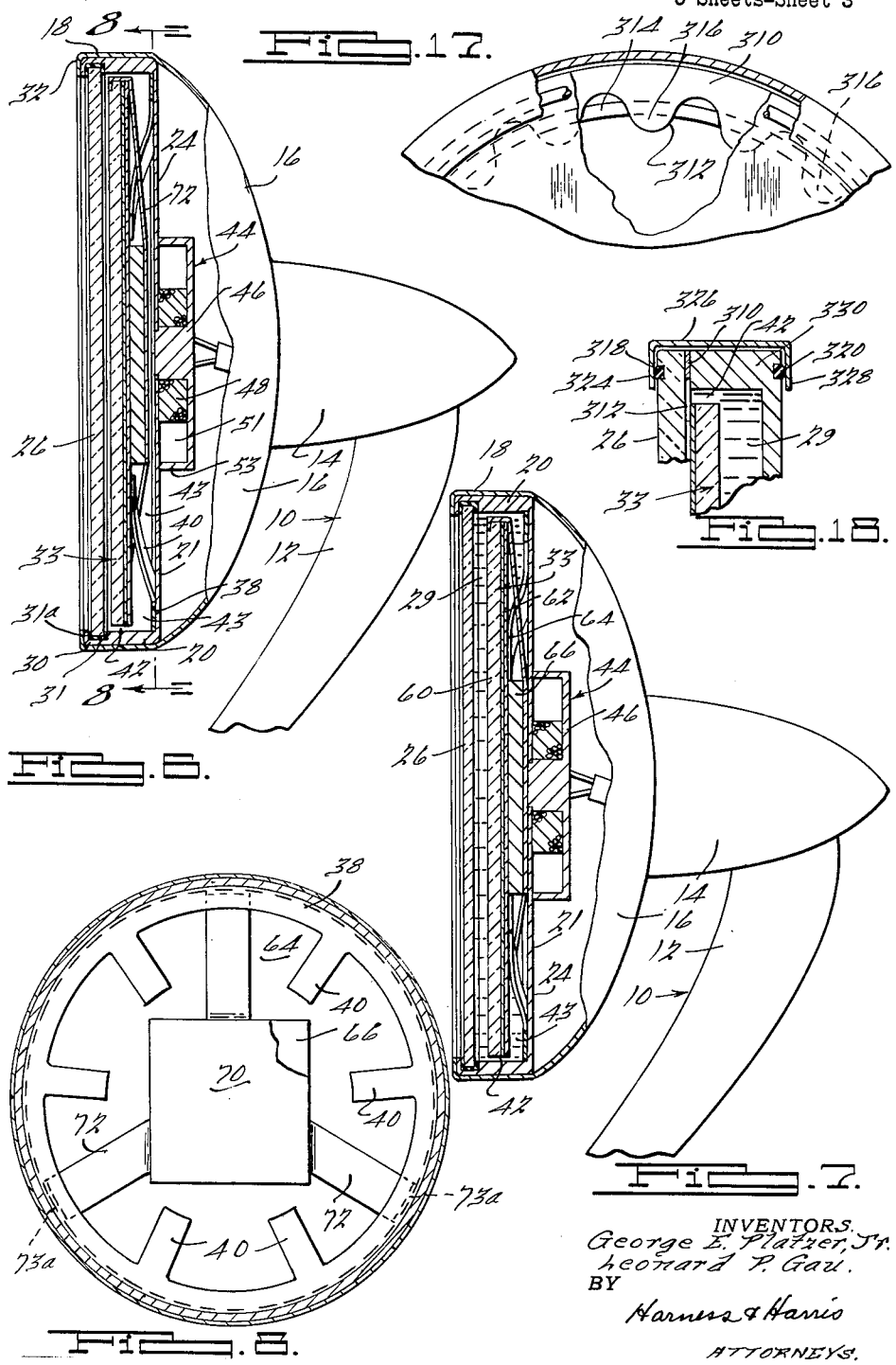

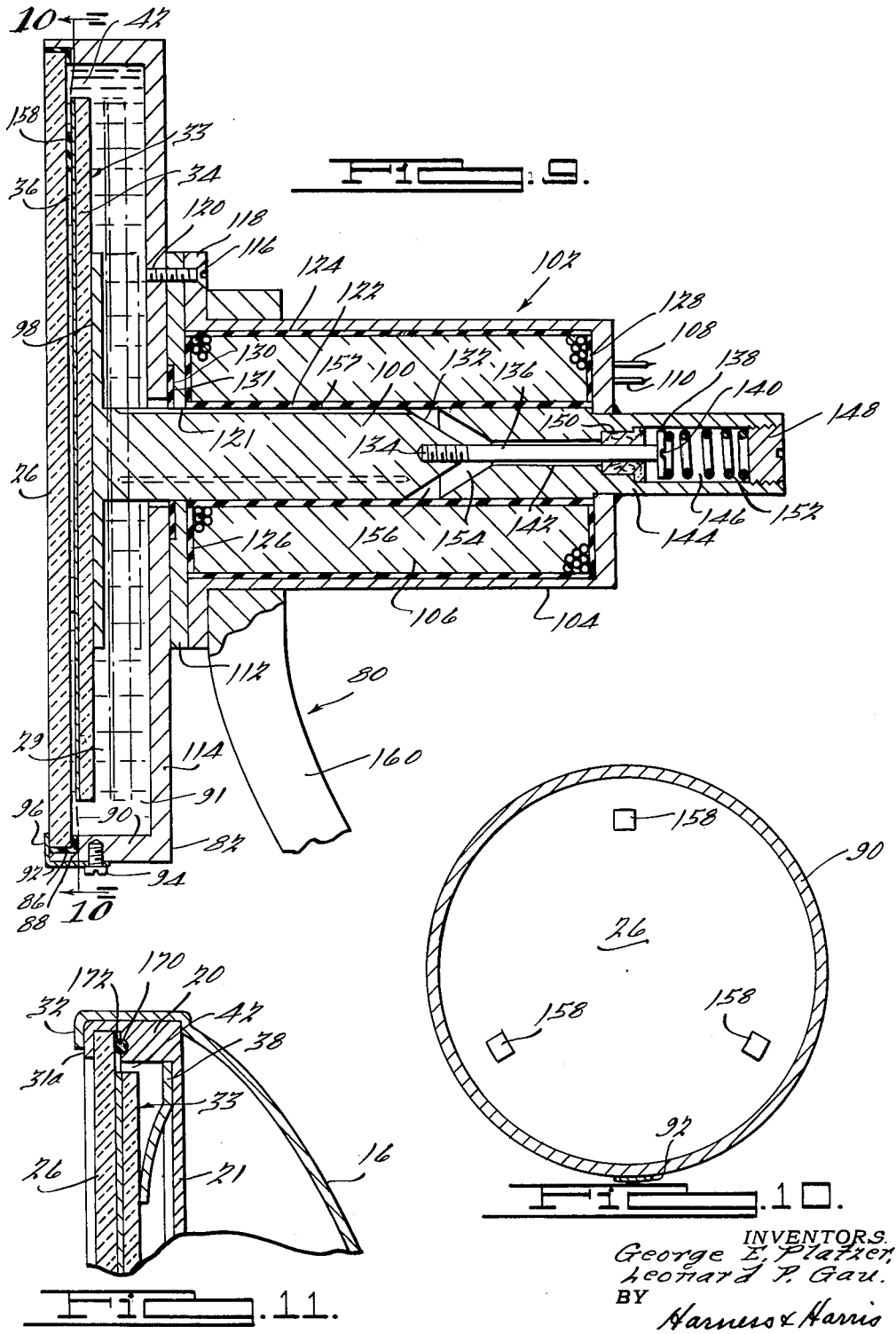

3,198,070
REAR VIEW MIRROR CONTAINING A FLUID LIGHT CONTROLLING MEDIUM
George E. Platzer, Jr., and Leonard P. Gau, Birmingham, Mich., assignors to Chrysler Corporation, Highland Park, Mich., a corporation of Delaware
Filed Dec. 1, 1961, Ser. No. 156,404
28 Claims. (Cl. 88—77)

The present application is a continuation-in-part of a copending application Serial No. 841,192 filed September 21, 1959, now abandoned, of the same inventors.

The present invention relates generally to mirrors containing a fluid light controlling medium and especially to mirrors of this type suitable for use as a rear view mirror either inside or outside of a motor vehicle. It specifically relates to a two-position or day-night rear view mirror employing a fluid control medium of optically dense character capable of inhibiting glare and which will mask or block out reflections of the mirror in its night position so as to avoid double images dangerous to driving at night.

A constant problem in motor vehicle operation has been the annoyance caused the driver by the glare of bright lights shining at night in the view mirror attached thereto and which are reflected into the driver's eyes. Under night time driving conditions these reflections especially of headlights of other moving cars are not only annoying but may become blinding and, therefore, dangerous.

Many proposals have been presented to alleviate this condition. That most popular has been a two-position rear view mirror of the prismatic type utilizing a swingable prism having a coated surface and a non-coated surface. This form of mirror is characterized by the presence of both a bright and a low intensity reflecting surface irrespective of the day or night position of the prism. These reflecting surfaces are separated by only a few degrees of angle and give double reflections which at night produce double images that may be annoying and troublesome to the driver.

Confined to inside rear view use in a vehicle, a prismatic mirror is feasible only because the driver when looking out the back window of the vehicle by the low reflective surface then sees only the interior roof of the vehicle with the bright surface. Where the roof has a headliner with a dark matted surface the prism works quite well. However, if the vehicle has a white headliner, interior chrome roof strips, or a large rear window, double images are seen by the driver.

Using a prismatic mirror outside of the vehicle or in a convertible with the top down is especially objectionable. Street lights, stop lights, and signs all appear at normal brightness. The multiple images projected to the driver by the two reflecting surfaces of the prism cause confusion and unnecessary glare and to confound things even more the images usually move.

Tilting the prism down or to the side so that the bright surface looks at the road or at the side of the car is helpful but does not eliminate the annoying double reflections. Even hooding of the prism is relatively ineffective with small prism angles of the character employed in these structures.

Moreover, we have found that a system employing two polaroid disks to dim the reflection from a mirror is also unsatisfacotry. With them there is an excessive loss of light due to polarization and transmission through the disks in the bright position and incomplete extinction of the mirror reflections in the dim position.

We have also found that the use of a plain glass front surface plate for low reflectivity combined for high reflectivity with a movable mirror that rotates about one edge between its positions is workable but requires that the mirror be rotated over an angle of about 40° to eliminate the bright surface reflection. It is for this reason impracticable for use as a rear view mirror. Moreover, it would produce a relatively large package that is difficult to style for automotive applications.

It has also been proposed to employ a fluid light transmitting mass as a means of reducing the glare of transmitted light but such applications as proposed have been of a theoretical nature only leaving to others the solution of such problems as fluid movements, expansion, and opacity essential for a practicable commercial application in the area of rear view mirrors of the type here embraced.

We have discovered that the foregoing problems and objections may be alleviated if not entirely eliminated by a two-position mirror system employing a sealed casing containing an optically dense stable control fluid of particular properties hereinafter more specifically enumerated, a layer of which is flowable between a movable mirror or mirrored reflector element and a relatively stationary clear glass light transparent sealing plate or window through which light is transmitted to the mirror. The mirror is mounted inside the case and operable within the fluid therein over a relatively small distance for example ⅛" between bright and extinct positions corresponding respectively to the day and night positions of the mirror. A bright reflection is obtained from the mirror by forcibly and resiliently moving the mirror toward and into juxtaposition with the sealing plate while pumping or squeezing fluid from between the plate and mirror in the course of such movement to reduce the layer of fluid to a predetermined maximum thickness which will permit an appreciable amount of light to pass through to the mirror.

The light reflections from the mirror should be inhibited or extinguished by the fluid when the mirror is moved back away from its close in position relative to the glass to its night (reflection extinct) position, fluid being displaced thereby from the surrounding fluid reservoir to between the window and mirror to provide a layer thereof adequate to substantially block the passage of light rays to the mirror and mask any reflections from the mirror.

The initial separation distance from which the mirror must be moved back in the fluid medium to accomplish this result is important from the standpoint of force and time required to do this. The smaller the initial separation the greater will be the force-time consideration. This initial distance is also a measure of the overall space requirements and weight since it is determinative of the opacity and amount of the fluid that must be used for a commercially feasible structure. We have found it possible to produce commercially operable structures with initial separation distances as low as 0.0005 while keeping the overall movement below .250" and the time of operation within a practical limit. This makes for minimum weight and vibration problems in the mirror mount.

The fluid must be optically dense and preferably stable over a wide range of temperatures for instance −30° F. to 200° F. While it should block out reflections of the mirror in its night position so as to have the reflections of the window glass predominate and avoid multiple images it should also permit the passage of light to the mirror in its bright or day position when a relatively thin layer of the fluid remains between the window and mirror. It is preferred that the total light reflectivity of the mirror structure be about 4% and less with the movable mirror surface reflector in its night or extinct position and be at least above 25% and preferably between 50% to 90% when the reflector is in its bright or day position.

Moreover, for reasons hereinafter more fully explained it is preferred that the fluid medium have an index of refraction which is equal to or nearly that of the window glass so as to eliminate certain possible reflections from the latter.

A satisfactory fluid may be constituted of a stable colloidal suspension of carbon black particles in a solvent such as kerosine. Reference is hereby made to the concurrently filed commonly owned application of Teague et al. Serial No. 156,535 for details of a specific fluid which by this cross reference is made a part hereof and to which no claim per se is made.

We have further noted that wide changes in ambient temperatures —30° F. to 120° F. to which a rear view mirror, particularly of the outside variety, is exposed may produce expansion in the fluid medium which unless relieved may cause a slight buckling or distortion of the window and any images it presents, and stressing of the casing. To avoid this condition the casing structure in the present invention is preferably designed to provide integrally or associated therewith elastomeric or metallic means facilitating expansion of the fluid. Rubber or thin metal flexible diaphragms or bellows are among those structures contemplated.

In our development of a commercial mirror structure, we have further discovered that the movement of a mirror in a fluid medium from its bright or day position in juxtaposition to the window glass (where the fluid has been squeezed from between them) to the extinct or night position requires substantial force to be accomplished in the few seconds' time believed essential to a practical mirror operation for vehicles. It has been theoretically determined that the force necessary to shift the mirror from the bright to the extinct position varies inversely as the cube of the initial separation distance (distance between mirror and window in the bright position) for a given separation time in seconds. Moreover, that the closer the mirror is to the window the longer will be the time required to separate them for a given force, this time varying inversely as the cube of the initial separation distance aforesaid for a given force. For example, it has been determined experimentally that with a gap of 0.0005" a force of about 4 pounds was needed to operate the mirror to its extinct position in about 5 seconds and with a gap of 0.001", two pounds in 3 seconds. Hence, the necessities of a commercial rear view mirror application requiring reasonably fast actuation time with relatively small forces and good light reflectivity in the bright position and minimum weight dictates the desirability of a minimum initial predetermined spacing of between 0.0005" to 0.010" preferably between 0.001 to 0.005" of the mirror and window in the bright position the latter range contemplating a movement of the mirror to extinct position of between 1/8" to 5/8". It has also been found desirable as hereinafter explained to provide a structure enabling the mirror surface and its reflections to be brought into substantial optical parallelism with the front surface of the window it faces and its reflections so as to make the bright image of the mirror coincident with the dim image of the front surface of the window and inhibit double images from conditions of non-parallelism.

Assuming parallel window surfaces, both predetermined spacing and parallelism may be attained by utilizing the back surface of the window as an indexing means to effect the foregoing relationships. Such indexing means may comprise, for example as hereinafter described, a plurality of circumferentially spaced, relatively small protuberances, spacers or shims of any suitable material impervious to the fluid medium, integral with, attached by suitable means to either or both of the mirror and window elements, or held in fixed relation thereto, to provide a definite spacing and optical parallelism.

A principal object of the invention is to therefore provide an improved day-night rear view mirror eliminating the need for a prism and which substantially inhibits glare and annoying double images in its night position.

Another principal object is to provide a mirror system comprising relatively movable plate-like elements one a transparent window and the other comprising a mirrored surface reflector facing the window and operable in an optically dense fluid determinative of a bright condition and a non-reflective light condition for the reflector, which system includes manual and/or power means for effecting relative movement of the elements for establishing said conditions.

Another object is to provide a system as in the preceding object having indexing means determining a minimum spacing between the elements in the bright position of the reflector.

Still another object is to provide a rear view mirror system comprising a relatively stationary transparent window and a shiftable mirror in parallel face-to-face relation with the window in an optically dense fluid the mirror being shiftable between a bright position wherein the mirror is in juxtaposition to the window and makes a single sharp image visible through the window and a highly attenuated or extinct position in which the mirror is more remote from the window and no image is visible through the window but only at the front surface of the window.

A particular object is to provide a mirror system as in the preceding object wherein spacing means are provided between window and mirror determinative of the juxtaposed relation between them in the bright position of the mirror.

A further object is to provide a mirror system as in the preceding objects in which image reflection from the mirror are substantially blacked out by the fluid in the nonglare condition of the system.

Still another object is to provide a mirror or mirror system as in the preceding objects which is suitable for both inside and outside vehicle application.

A specific object is to provide a mirror system embodying a transparent window element, a mirror surfaced reflector element relatively movable with respect to the window in a fluid medium containing the reflector and which fluid controls visibility of the light reflections from the rear face of the window and mirrored surface of the reflector; wherein provision is made for expansion and contraction of the fluid medium during temperature changes to which the system is subjected without affecting the optical flatness of said window. The mirror is unaffected since pressure is the same on both of its surfaces.

Another specific object is to provide a mirror system as in the preceding object wherein said means for accommodating expansion and contraction of the fluid medium is a bellows or flexible diaphragm.

A further specific object is to provide a mirror system as in the two preceding objects wherein one of said relatively movable elements provides indexing means to bring the rear face of the window and the mirrored surface of said reflector into parallelism whereby to make the bright image reflections from the mirrored surface in the bright position of the system substantially coincident with any dim image reflections from the front surface of the window.

Another object is to provide a mirror system and structure as in the preceding objects wherein the fluid chamber is closed to inhibit evaporation of fluid and to prevent objectionable fluid odor and seepage.

Other objects and advantages of the invention will appear from the drawings and from the following description of a number of exemplified embodiments of the invention which are intended to be illustrative only and not to limit the broad novel features of the invention.

In the drawings:

FIGURE 1 is a side elevational view of a rear view mirror in its bright position having a portion broken away and in section to more clearly show the invention.

FIGURE 2 is a front view taken in the direction of the arrow 2 in FIGURE 1;

FIGURE 3 is a view similar to FIGURE 1, illustrating a second (extinct) position of the mirror structure comprising the invention;

FIGURE 3-A is a schematic arrangement of the optical parts of the mirror structure of FIGURE 1, illustrating the possible paths of a ray of light;

FIGURE 4 is an end view of a modified form of the reflector assembly shown in FIGURES 1 and 3;

FIGURE 5 is a sectional view taken on the line 5—5 of FIGURE 4;

FIGURE 6 is a side elevational view partly in section similar to that of FIGURE 1 utilizing the structure of FIGURES 4 and 5;

FIGURE 7 is a view similar to that of FIGURE 6, illustrating a second position of the structure in that figure;

FIGURE 8 is a sectional view taken at 8—8 of FIGURE 6 showing the pressure spring mechanism for moving and holding the reflector element in its forward position;

FIGURE 9 is a side elevational view in section of a modified form of structure utilizing a solenoid actuating means for the mirrored reflector and embodying indexing means for determining the relationship between the window and reflector elements in the bright position of the mirror system in this figure; the phantom lines indicating the dim position of the mirrored reflector;

FIGURE 10 is a sectional view taken at 10—10 of FIGURE 9, illustrating the indexing means as applied to the window element;

FIGURE 11 is an enlarged sectional view of an edge portion of the structure of FIGURE 1 showing a modified form of sealing structure between the window and casing structure in this figure;

FIGURE 12 is a side elevational view in section of a further modification of the structure of FIGURE 1, showing the fluid chamber provided with a flexible elastomeric expansion wall;

FIGURE 13 is an end view (reduced in size) looking in the direction of the arrows 13—13 of FIGURE 12;

FIGURES 14, 15, and 16 are modifications of the structure in FIGURE 12 employing flexible metal bellows structures for mirror actuation and/or fluid expansion; and FIGURES 17 and 18 are further modifications applicable to all forms of structure showing a shim type of indexing means between the window and reflector.

Referring first to FIGURE 3-A which diagrammatically illustrates the principle of operation and features of the mirror system and structure of the invention briefly discussed above, this figure shows a clear piece of glass A on the left corresponding to a window through which light passes, a reflector element B on the right also usually of clear glass and having a mirror surfacing C of bright vacuum deposited chromium, or aluminum over chromium on its side facing the window A, and a body of fluid D between the elements A and B that is optically dense and preferably of a character having an index of refraction in the order of that of the window A.

A light ray of intensity I passes through the glass A to the mirrored surface C. Three principal reflections X, Y, and Z are theoretically possible. Reflection X at the air-glass interface has an intensity of about 0.04 of I (ratio of light reflected from the window front surface to the initial intensity) or 4% of I. Assuming a fluid D and window A of slightly different indexes of refraction for example 1.4 and 1.5 respectively any reflection Y occurring at the fluid-glass interface has an intensity of only about 0.1% of I, or only about 2.5% of X.

The intensity and effect of the reflection Z depends on the intensity I, the character of the mirror surface, the character of fluid, and the thickness of fluid layer which the ray must penetrate. With a chromium mirror surface C the intensity of Z, in the absence of any fluid D, and with the mirror in its bright or day position (A and B abutting) is about 55% of I. However, all of the fluid D is never squeezed out from between A and B in the bright or day position of the mirror, this resulting in some attenuation in the intensity of the reflection Z. With a layer of about 0.001" remaining between A and B, the intensity of Z is about 45% to 50% of I, employing a fluid having an exponential absorption coefficient ($\mu$) of about 60-65 inches$^{-1}$. This absorption coefficient is defined by the equation which mathematically describes the process of absorption of light by an absorbing medium. That equation is:

$$I = I_0 e^{-\mu x}$$

where $I_0$=initial ray intensity
$I$=intensity after passing a distance $x$ in the medium
$e$=the base of the natural logarithm
$x$=distance traveled by the ray in the medium
$\mu$=exponential absorption coefficient of the medium With a bright vacuum deposited aluminum over chromium mirror surface C on the member B and a layer of fluid of about 0.001 between A and B, the intensity of Z is about 70% of I in the bright or day position of the mirror B. In either example with the mirror B in the rearward or night position and with a layer of such fluid of about 0.125" between A and B the opacity of the fluid is such that the intensity of reflection Z is only about 0.000001% of I. Accordingly, reflection Z is for all practicable purposes eliminated or extinct in the night position of the mirror B.

Now considering the effects of these reflections on a vehicle driver, it will be evident that in the day position of the mirror B with a thin layer of fluid D remaining between A and B all three reflections X, Y, and Z are possible. The reflection Z is by far the brightest and clearly outweighs the dim reflections X and Y. If the opposite sides of the window A are parallel the weak reflection Y is superimposed on the dim reflection X. Moreover, in the daytime the driver's eyes are attracted to the whole picture appearing in the mirror and to the many objects seen such that the reflections X and Y present no problem from the standpoint of annoying double images in conjunction with the reflection Z. Any misalignment of the window A and mirror surface C accentuates any separation of the reflections and although not serious is one reason for providing measured spacers between the window A and surface C and an expansion means capable of maintaining the fluid pressure at atmospheric pressure, for assuring substantially parallelism.

The conditions at night are critical, for only illuminated objects appear in the mirror, such as a pair of headlights, and multiple reflections may cause many more headlights to be seen by the driver causing annoyance and confusion to him. Thus at night the reflection Y although very weak as compared to X may give trouble to some drivers. Hence, to avoid even this condition it is preferred that the fluid D not only be optically dense but also have an index of refraction in the order of that of the window glass A, for in that event the light ray I passes out of the glass A into the fluid D without any change of direction and no reflection is produced at the glass-fluid interface. An index of refraction close to that of the glass also keeps the night or non-glare position reflectivity low. The 4% reflection from the front surface of the glass is preferably a maximum desirable intensity for the non-glare position.

The deletion of the reflection Z in the night position is quite important and critical because as stated above the eye can readily see any separations of light reflections at night, such as multiple sets of headlight beams, and if the reflection Z is not substantially extinct as will be the case where a fluid D is employed that merely partially diminutes the light intensity of ray I reflections, reflections X and Z and even Y could be visible and the multiple images resulting would be annoying and could be dangerous to the driver, these conditions being accentuated where the surfaces producing these reflections are misaligned, i.e., out of parallelism.

Hence, from the optical standpoint optimum conditions are obtainable when:

(a) Parallelism exists between the mirror reflecting surface C and window A, in the day or bright position;

(b) The fluid D is sufficiently optically dense to eliminate reflections Z in night positioning of the mirror; and (c) The fluid D has an index of refraction in the same order as that of the window glass A.

Referring now to the remaining figures of the drawings, FIGURES 1 to 3 show a side mounting type rear view mirror device generally designated by the numeral 10 provided with a mounting bracket 12, preferably of non-magnetic material such as die cast aluminum or brass, which is preferably secured to the outer side surface of a vehicle (not shown). The bracket 12 is secured at its outer end to a hub or housing 14, the latter having an integral outwardly flaring hollow spherical section 16 which terminates in a cylindrical portion 18, engaging a cylindrical wall 20 of the casing or enclosure 21 of a unitary mirror assembly generally designated by the numeral 22 which it houses. The casing 21 preferably of aluminum or brass is of a generally dish-shaped configuration and is provided with a rear wall 24 formed integrally with the cylindrical wall 20. The forward or open end of the casing 21 is closed by a circular sealing glass or window 26 comprising a piece of clear transparent glass plate received in a generally U-shape flexible seal 28 disposed against a shoulder 28a in an annular recess 30 in the forward edge portion 31 of the cylindrical wall 20 of the casing 21. The edge portion 31 is coined or spun over, the glass 26 and seal 28 as at 31a to tightly retain the same in the recess against the shoulder 28a. The forward edge of the cylindrical portion 18 of housing 14 is coined inwardly at 32 to provide a stop for the casing 21 of the assembly 22 and to maintain them in position against the spherical section 16.

Disposed directly behind the clear glass plate window 26 is a mirror or reflector generally designated by the numeral 33 and preferably comprising a plate 34 of suitable material, preferably glass, which preferably has a mirrored surface 36 on the side thereof adjacent and facing the window 26. It will be understood, however, that as hereinafter shown in FIGURE 5 the plate 60 corresponding to the plate 34 of FIG. 1 may be of optically clear glass having the mirrored surface 62 on its rearward side, i.e. the side most remote from the window 26. A circular flat spring 38 shown in greater detail in FIGURE 8 is seated against the rear wall 24 of the casing 21 and is provided with a plurality of equally spaced resilient fingers 40 (six being shown in FIGURE 8) which extend inwardly and forwardly of the wall 24 to engage the rear side of the reflector 33 and urge the same forwardly in juxtaposition to the plate window 26 and which may be against the window 26 except as otherwise described below.

The mirrored surface 36 of the reflector 33 is clearly visible through the transparent glass plate window 26 and acts as the reflecting surface for the device 10 in the bright position of the reflector 33. The bright mirrored surface 36 is preferably formed on the glass plate 34 by well-known vaporization procedures and the thickness thereof shown in the drawings is exaggerated for the purpose of illustration. Although various metals may be used in vaporized forms to produce the mirrored surface it has been found that vacuum deposited vaporized chromium or aluminum over chromium, particularly the latter, give excellent results and are preferred. For example when vaporized chromium is used for the mirror surfacing 36, a ray of light striking the same will be reflected with an intensity approximately 55% of that of the incident ray and the value for the bright aluminum surfacing will be much greater in the order of 70 to 80%.

In accordance with our invention the casing or enclosure 21 of the intermediate or unitary mirror assembly 22, and which is sealed by the window plate 26 and resilient seal 28, is filled full with an optically dense fluid 29 to which the seal 28 should be impervious. This fluid must have the properties of opaqueness essential to inhibit reflected light rays off the mirrored surface 36 when the reflector or mirror 33 is in its right hand or extinct position (FIGURE 3) and permit penetration of light rays in the bright or day position (FIGURE 1), it having been pointed out above that all of the fluid is never squeezed out from between the window and mirror in the bright position. The fluid 29 should be a stable liquid throughout the temperature range to which the device may be subject in use, for instance —30° F. to 120° F. and must have viscosity compatible with free movement within the casing 21. Although various opaque fluids may be used, we have found that a stable colloidal suspension of fine carbon black particles dispersed with the aid of rubber molecules in a kerosine or comparable solvent all as described in said application of D. M. Teague et al. aforesaid will provide excellent results. Kerosine and other hydrocarbon solvents are also desirable from the standpoint of providing a fluid with an index of refraction comparable to that of the window glass.

It will be noted from FIGURES 1 and 3 that the reflector 33 has a predetermined diameter which is less than the inside diameter of the annular portion 20 of the casing 21, such providing an annular gap 42 between the outer edge of the reflector 33 and the casing portion 20. This gap 42 permits the free movement of the fluid to between the reflector 33 and window 26 when the reflector 33 is moved rearwardly in the casing 21. In the latter connection it will be noted that the casing 21 is of greater depth between the window 26 and rear wall 24 to provide space 43 to accommodate such movement of the reflector and provide space for the spring 38 and other operating elements to be mentioned. Such gap 42 and space 43 together also provide a reservoir or chamber 43 for the fluid 29 and from which the fluid may be displaced at will in accordance with the movement of the reflector 33. As previously noted a movement in the order of .125" with a fluid such as described will satisfy the desired optical conditions and enable the obtaining of a compact mirror assembly 22. For commercial reasons a distance less than about ¼" is preferred.

Any suitable means, manual or power, may be employed in connection with the movable reflector 33. In FIGURES 1 to 3 such is in the form of electromagnetic means generally designated by the numeral 44. It comprises an armature or plate 45 of magnetizable material such as soft iron or steel and a cylindrical electromagnet 46 comprising a soft iron field member 47 and an electric field coil 48 suitably connected by wires 50 with a source of D.C. power, such as the vehicle battery, with which they communicate through the hub 14 of bracket 12. As seen the armature 45 which is of generally flat disc shape is suitably secured to the reflector 33 as by a suitable flexible epoxy cement or an elastomeric nitrile rubber glass to metal bonding material such as described in the copending commonly owned application of Sherman et al. Serial No. 779,799, filed September 30, 1958, impervious to moisture and the solvents of the fluid 29. In the electromagnet 44 shown, the iron field member 46 is recessed as at 51 to receive and house the coil 48 and provide a central pole portion 52 and an annular pole 53 by which the electromagnet 46 may be suitably secured to the wall 24 of the casing 21 by a known means such as brazing or cementing. The forward end of pole 52 may as shown project through an opening 55 in the wall 24 in which case a fluid tight fit and seal will be effected between them. The projecting end of the pole 52 may if desired be provided with a shouldered end portion 54 which may pass through the opening 55 and be peened over or riveted to the wall 24. This makes a compact assembly of the unit 22 and only one major fluid seal, such as the seal 28 is required.

In operation of the device in FIGURES 1 to 3, it will be seen that the spring 38 normally urges the reflector 33 to the left to the position in FIGURE 1. Although the reflector is shown in abutment with the window plate 26, this is somewhat exaggerated since all the fluid is actually never squeezed from between the two members but a thin film of fluid remains whose thickness has considerable bearing on the time-force relationship possible in the operation of the device. Energization of the electromagnetic means 44 will create an electromagnetic field causing the armature 45 and its attached reflector plate to be drawn rearwardly of the mirror structure to the position shown in FIGURE 3. In this movement the reflector 33 acts as a pump and the electromagnet is required to supply sufficient force to pump the fluid between the sealing window glass 26 and the reflector or mirror 33 in a reasonable length of time. With an initial separation distance between window and reflector of 0.0005" it will take a force of 4 pounds to move the reflector 33 of 4.5" diameter rearwardly 0.125" in about 5 seconds. With a gap of 0.001" about 2 pounds in about 3 seconds are required. In this movement the fluid disposed in the reservoir area 43 between the reflector 33 and the rear wall 24 of the casing 21 and in the gap 42 surrounding the reflector is displaced to the area between the window plate 26 and reflector 33. As shown in FIGURE 3, therefore, when the reflector 33 is in its rearward or second position (its night or extinct position) the opaque fluid covers or masks the mirrored surface 36 of the reflector and is of sufficient optical density to prevent any reflection therefrom of light coming in through the window 26. As a result, and assuming parallelism between window and reflector any reflection which is obtained from the mirror assembly 22 and visible to the driver must come from the window glass 26. As previously pointed out this reflection is only about 4% of the incident ray but is sufficient for the driver to note.

It will be seen, therefore, that under normal driving conditions when the mirror mechanism 10 is in its first or bright position as shown in FIGURE 1, there is a relatively high degree of reflectivity from the mirror since the mirrored surface 36 of the reflector 33 is in juxtaposition with the transparent glass plate window 26 with at most a very thin layer of fluid between them and a high degree of reflection is obtained as if the glass plate 26 was not there. However, when the electromagnet 44 is energized and the mirrored surface 36 of the reflector 33 is retracted rearwardly causing a substantial layer of opaque fluid to cover it, the amount of reflectivity of the mirror device 10 is reduced to about 4.0% since all reflection now comes from the glass plate 26.

FIGURES 4 to 8 show a modification of the reflector 33 and metal armature 45 combination shown in FIGURES 1 to 3. In FIGURES 4 to 7, the reflector unit 33 comprises a clear glass member 60 provided with a mirrored surface 62 on the back side as compared to the front side of the plate 34 in FIGURES 1 and 3.

An advantage of this construction is that a protective coating 64 of suitable material impervious to the fluid 29 may be used over the mirrored surface 62. A protective coating on the mirrored surface allows a greater latitude in the selection of the opaque fluid 29 since any problem of chemical reaction between the metal of the mirrored surface and the liquid 29 need not be considered.

A further difference in this modification over the structure in FIGURES 1 to 3 is that the armature 45 of FIGURE 1 is in FIGURES 5–8 where it is numbered 66 not bonded to the reflector 33 as in FIGURE 1, but is secured in any suitable manner as by cementing with a material impervious to the fluid 29, or by riveting, spot welding or the like to a spring member 68. The spring member 68 has a central portion 70 which approximates the size of the armature 66 and to which the latter is secured as described above. The spring member 68 is provided with three equally spaced integral fingers 72 which extend outwardly therefrom and clampingly engage the edge 73 of the reflector glass 60 at three equally spaced locations. As shown, the outer radial ends of the fingers 72 are bent inwardly to form hooks 73a which preferably seat in conforming recesses 74 of the reflector so as to permit the reflector 33 to be brought into close face to face juxtaposition with the glass window 26. It will be understood that the hooks 73a may have their forward faces 76 extend slightly beyond the forward face of glass 60 so as to provide a positive limit stop for the reflector 33 in its bright position for reasons hereinabove given.

The use of the spring member 68 accommodates a smooth operation of the mirror device. When coil 48 of the electromagnet 44 is energized the armature 66 and central portion 70 of the spring 68 are immediately urged rearwardly toward the iron core 46 and rear wall 24 of casing 21 under the influence of the magnetic field created. This tensions the fingers 72 which pull the reflector 33 inwardly with the armature. However, the spring characteristics of the fingers 72 allow a certain amount of lag in the movement of the reflector 33 to accommodate for the movement of the fluid 29 from the back of the casing to the front. In other words, there is lost motion between the armature and reflector that permits the armature to build up some tension in the spring fingers while it moves to a stronger region of the electromagnetic field where the pull is increased to accelerate movement of the fluid.

The modification in FIGURES 9 and 10 differs from FIGURES 1 to 8 in featuring the use of a solenoid for effecting movement of the reflector and provides thin spacing elements intermediate the window plate and reflector to provide a relationship between them facilitating an optimum force-time combination for practical operation of the mirror device. When as in the FIGURE 1 structure, the reflector is of a floating character, spacer elements such as these when applied thereto, better assure parallelism between window and reflector in the bright position of the latter.

The mirror assembly 80 in FIGURE 9 comprises a dish-shaped casing 82 of suitable material which may be plastic or a metal, such as aluminum, whose forward end is closed by a clear transparent window plate 26 set in a sealing ring 86 seated in an annular shouldered recess 88 in the cylindrical wall 90 of this casing to define a chamber 91 containing an opaque fluid 29. The window is suitably seated in the recess 88 by conventional means such as a plurality of L-shape spring clips 92 secured to the wall 90 by screws 94, the forward ends of the clips being provided with window engaging lips 96. Within the chamber is a glass reflector 33, such as seen in FIGURE 1, comprising a plate 34 having a mirrored surface 36 which reflector is suitably secured to a disc-like flange 98 of a movable soft iron core member 100 of a solenoid generally designated by the numeral 102. The solenoid includes a hat shaped housing 104 enclosing a cylindrical magnetic field winding 106 having current leads 108, 110. A base plate 112 of iron closes in the winding 106 at the forward end and is mounted to the rear wall 114 of the casing along with the housing 104 by screws 116 which extend through the flange 118 of the housing 104 and through the plate 112 into threaded holes in the wall 120 of the casing 82.

The movable core member 100 extends through a central opening 121 in the plate 112 which provides a narrow bearing surface therefor and is loosely slidably supported in a tube 122 of electrical insulation material which together with an outer tube 124 and end washers 126, 128 insulate the coil 106 from the surrounding metal parts. The plate 112 is recessed at 130 to receive a suitable elastomeric seal 131 impervious to the fluid 29 and which will limit the leakage of fluid from the chamber 91 to the solenoid. Preferably the bearing 121 provided for the core member in the plate 112 and tube 122 will be such as to permit orientation of the reflector 33 to facilitate parallelism thereof with the glass 26 when the reflector is in its forward or bright position.

The core member 100 has a tapered end portion 132 in which is suitably secured as by a threaded portion 134 an elongated narrow stem-like non-magnetic extension 136 having an enlarged end 138 provided with a screw driver slot 140. The non-magnetic extension 136 projects with clearance through a bore 142 of the rearward stationary soft iron core member 144 which is secured as by welding to the housing 104 and extends through the top thereof. The stationary member 144 has an enlarged stepped bore or chamber 146 connecting with the base 142 which is closed by a threaded plug 148. Fitted in the bore 146 is a bearing bushing 150 for guiding the stem 136. Also positioned in the base 146 is a compression spring 152 which resiliently normally biases the movable core 100 and attached reflector 33 to its forward or bright position. The forward end of the stationary core 144 has a tapered recess 154 complementary to the tapered portion 132 of the movable core 100 and in the forward biased position of the reflector 33 with the coil 106 deenergized there is a gap 156 between the portion 132 and recess 154 such that when the coil 106 is energized the core 100 will be drawn further into the coil closing the gap 156 until the portion 132 abuts the wall of the recess 154, the latter thus serving as a limit stop for rearward movement of the reflector, the reflector being then in the phantom position shown by the dot and dash lines in FIGURE 9. In order to facilitate rearward movement of the core 100 when there is any oil accumulation in the gap 156 the core 100 is provided with one or more longitudinal surface grooves 157 extending past the bearing 121 and connecting with the gap 156 to permit flow of oil out of the gap 156.

The core 100 preferably extends beyond the longitudinal center portion of the field coil 106. In this way the strongest pull will be exerted on the core 100 by the magnetic field established by the coil 106 and stationary core 144 to overcome the spring 152 bias and displace the fluid 29 from the rear portion of the chamber 91 to between the reflector and window. A strong pull is desirable in order to initiate movement of the reflector and rapid shift from the bright to the extinct position.

In order to assume the same relationship between reflector and window in repeated operations of the reflector to the bright position and reduce the fluid layer between them to a thickness providing optimum rearward movement of the reflector when the solenoid 102 is energized, a plurality of small equally spaced limit stops or spacing means 158 are provided (three being shown) intermediate the window and reflector. As previously described the spacers will preferably provide a very slight gap between the window and reflector in the order of .0005 to .0015". The spacing or indexing means here may be in the nature of thin wafers 158 of small area secured as by cementing to the window or reflector or may be protuberances provided in the window or reflector or both in the making of the same, or may be a deposit of ceramic material, or a glass sliver secured by a silicate cement material to the window and fused by heating to a condition impervious to the fluid 29. With sufficient alignment freedom in the reflector 33 the stops 158 also provide a means of bringing the mirrored surface 36 of the reflector 33 into parallelism with the inner face of the window 26.

The mirror assembly 80 in FIGURE 9 may include any suitable mounting means such as a bracket 160 for mounting the mirror in or on a vehicle. It will be understood that a suitable control switch manually or automatic in operation will be provided in association with a source of power, such as the vehicle battery, for effecting energization and deenergization of the solenoid 102. Similar controls are, of course, contemplated for the electromagnetic operators of FIGURES 1 and 6.

Referring now to FIGURE 11, there is here shown a modification of the mirror structure of FIGURE 1, wherein the seal provided between the window 26 and the annular wall 20 of the casing 21 in FIGURE 1 is of the O-ring type. Thus the annular wall of the casing is provided in its forward face with an annular shallow recess 170 in which is cemented an O-ring seal 172 of suitable elastomeric material such as neoprene impervious to moisture and the fluid 29 and which projects beyond the end of the casing into resilient abutment with the window 26 which by reason of the turned over lip 31a of the casing 21 presses against the seal to produce a fluid tight joint. A similar arrangement may be incorporated in the structure of FIGURES 6 and 9.

It has been previously been pointed out that the mirror device of our invention must necessarily be exposed to wide changes in temperature, for instance —30° F. to 120° F., as a result of which the fluid 29 and casing will expand and contract, the greatest change occurring in the fluid 29. For example, the fluid could change by $\frac{1}{10}$ of its volume over the temperature range of —30° F. to 200° F. In order to compensate for such changes without stressing the optical elements or casing, the structure of FIGURES 12 and 13 incorporates in addition to other features described above found in FIGURES 1 to 11, means for accommodating changes in volume of the fluid due to changes in temperature as well as means for remotely controlling the reflector for both day and night and angular positioning by manual or power means or a combination of both.

Thus in FIGURES 12 and 13, a mirror unit assembly is shown designated by the numeral 180 adapted to be supported and adjustable by remote control in a housing 182 which in turn may be supported upon a pedestal 184. The unit 180 includes an L sectioned frame member 186, an annular retaining or compression ring 188, a shape premolded elastic diaphragm 190, a circular mirror support and control mounting plate 192, an O-ring seal 194 and a circular day-night reflector control cable retainer and mounting plate 196. The compression ring 188 serves to force the window 26 against the O-ring seal 194 seated in a recess 197 in the forward face of the frame 186 and to force the support plate 192 against the peripheral marginal portion 198 of the diaphragm 190 which abuts the opposite or rearward face of the frame 186, so as to produce a fluid seal and fluid receiving chamber 200 within which a disc shaped reflector 33 similar to that of FIGURE 1 may move in a coaxial direction. The compression ring is provided with a front inwardly turned lip 202 and with a plurality of circumferentially spaced rearward tabs 204 which bend over the plate 192 to affect the seal.

The diaphragm 190 preferably comprises a preformed molded shape of rubber-like elastomeric material such as Buna N rubber, impervious to moisture and the solvents in the fluid 29. As shown it comprises a substantially flat disc shaped wall 198, the central portion of which is turned back on itself to provide an open pleat or lip 208 defining an opening 210 and a forwardly spaced annular flange portion 212. As shown the reflector 33 is secured to and supported to some extent by the diaphragm flange 212. The flange 212 may be bonded to the rear face 214 of the glass reflector 33 by a suitable cement, for example a flexible epoxy cement, impervious to moisture and the fluid 29. The lip 208 will have sufficient shape retaining strength to help support the reflector 33, and retain the fluid, but will be sufficiently elastic to flex like the pleat of an accordion to permit rearward movement of the reflector 33 in the fluid chamber 200 from its bright or day position shown to its rearward extinct or night position shown in phantom at 220 which may be against the inturned lip 222 of the frame 186. As previously described, this movement will preferably be in the order of about .125" which will permit the displacement of sufficient fluid by the reflector to between the window and reflector to black out the mirrored surface 36 and inhibit any reflections of light therefrom.

Although any suitable means either manual or power for example that as shown in FIGURES 1 to 11, may be employed for shifting the reflector between its bright and extinct positions, FIGURE 12 provides for a remote control through a wire or cable 224 held by the metal control mounting and retaining plate 196. The plate 196 may be bonded to the face 214 of the reflector by any suitable cement or elastomeric material referred to above impervious to moisture and the solvents contained in the fluid 29. The plate 196 is preferably formed with a hole 226 through which the wire 224 is threaded and with a central outwardly pressed portion 228 forming a space 230 for the enlarged end 232 of the wire.

In order to support the mirror assembly and bias the reflector forwardly the support plate 192 is dished outwardly in its central portion to provide an inner annular spring retaining depression 234 and an outer bearing depression 236 adapted to seat for pivotal motion against a semi spherically headed bushing 238 having a bore 239 through which the wire 224 extends into a flexible sheathing 240 for connection with a manual or power operating member, not shown. The bushing 238 together with the bearing depression 236 of the mirror mounting plate 192 provide a swivel joint for the mirror assembly 180, enabling the reflector to be adjusted to any angular position desired independently of its day and night positions. The bore 239 is large enough to permit pivoting of the mirror assembly without causing interference of the wire therewith. A hole 242 is provided in the plate 192 centrally of the depression 236 through which the wire 224 may extend. A coil compression spring 244 seated in the depression 234 and bearing against the wire retainer plate 196 provides ample force for shifting the mirrored reflector 33 to its forward or bright position upon release of the force acting on the cable 224 holding the reflector in the rearward or extinct position. The reaction of the force pulling the mirror rearwardly is taken by the sheathing 240 which may be threaded or staked into the bushing 238 to prevent relative motion between them. Alternatively the bushing may be provided with a stop shoulder (not shown) at the bottom of the bore 239 to prevent forward movement of the sheathing.

The swivel bearing bushing 238 is slidable in a bore 246 of a flanged supporting plate 247 secured by screws 248 to the housing 182 and is biased forwardly by a conical compression spring 248 to seat in the bearing depression 236 of the support plate 192. An opposite balancing force is furnished by the mirror assembly angle adjustment wires or cables 250, 252, 254 (see FIGURE 13) operating in flexible tubes 250a, 252a and 254a which are constantly under tension and connected to a manual control not shown. For specific details of a three wire control such as here contemplated for making angular mirror adjustments, reference is made to the patent to Jacobson 2,931,245, the structure of which insofar as applicable here is adapted and made a part of this disclosure.

As best seen in FIGURE 13, the wires 250, 252, 254 are connected to the support plate 192 at equally spaced angular positions and as seen in FIGURE 12 have headed ends 257 nesting in apertured outward depressions 258 formed by pressing out portions of the support plate 192. Located angularly intermediate the wire positions in the metal support plate 192 are large pie-shaped outward depressions 206 overlying the wall 198 of diaphragm 190.

These depressions serve to stiffen the support plate 192 and in particular provide spaces facilitating some overfilling of the chamber 200 with fluid, and providing relief pockets into which the diaphragm may expand when tensioned by overfilling or expansion of the fluid due to temperature changes. Initial tensioning of the diaphragm to avoid voids in the chamber due to contractions of the fluid volume at low temperatures is not required as atmospheric pressure will act on the diaphragm to prevent cavitation.

Thus by operation of the diaphragm 190 the chamber 200 in addition to being a fluid reservoir becomes an expansion chamber for the fluid accommodating increases or decreases in the volume of fluid due to temperature changes. It will be observed that by reason of the accordion or lip 208 construction of the diaphragm, fluid in the chamber 200 in FIGURE 12 is excluded from the central region at the rear of the reflector 33 such that neither the reflector operating means 196, 224 or return spring 244 in this modification operates in the fluid.

As in the previously described forms an annular gap 42 is provided between the edge of the reflector 33 and the frame 186 to provide for easy flow of fluid into and from the space between the reflector and window plate 26. In this connection it will be noted that the arrangement in FIGURES 12 and 13 include the reflector spacing means 158 described in connection with the FIGURE 9 construction. Any one of the previously or subsequently described spacing or indexing means may be employed.

FIGURES 14, 15, and 16 illustrate other embodiments of the mirror device of our invention having all of the principal features discussed above.

Thus FIGURE 14 embodies the window mounting and sealing feature of FIGURE 12 but combines the frame, and support member into a unitary metal casing 270 and provides other means for biasing the reflector 33 to its forward or bright position against the indexing spacers 158 and to compensate for difference in fluid volume by temperature changes. As shown the rear wall 272 of the casing in FIGURE 14 has suitably mounted in openings therein, as by brazing, a pair of flexible metallic bellows 274, 276, each of which is closed at its outer end and open at its inner end and opens through the wall 272 into the fluid chamber 200. The bellows 274 is coaxial with the reflector 33. Bonded to the rear face of the reflector 33 is a metallic disc reflector operator 278 having a rearwardly extending stem 280 secured as by brazing to the closed end 282 of the bellows 274. Also bonded to the closed end 282 of the bellows 274 is a ring plate 284 to which a suitable operating wire or cable 286 may be connected for applying force manually or by power from a remote location, for example, the dash of the vehicle to operate the reflector. In the position of the reflector shown in FIGURE 14 the bellows will be under sufficient tension to apply a reactive force biasing the reflector against the window 26 within the limits of the spacing means 158. Any pull exerted on the end 280 of the bellows by the cable 286 will be transmitted directly to the reflector 33 to effect its rearward movement the required distance to obliterate any reflections from its mirrored surface 26. Such will also resiliently expand the bellows 274 to provide sufficient reactive force to displace the fluid and return the reflector to its bright position when the pull on the cable is removed. In the rearward movement of the reflector 33 the shoulder 288 of the casing 270 may function as a limit stop.

The bellows 276 may be attached to the wall 272 at any convenient place spaced from the bellows 274 and from connection points for mirror angling cables such as the wires 250, 252 and 254 of FIGURE 13 if the same are to be used. The bellows 276 is in free condition at normal room temperature and will allow for closing down of the bellows by atmospheric pressure during temperature drops when the fluid volume will decrease. Obviously the bellows 276 will expand upon expansion of the fluid 29 due to an increase in temperature above filling temperature. Moreover it will be compressed by the inherent compressive tendency and when necessary by atmospheric pressure when compensating for an increase in volume resulting from expanding motion of the bellows 274 when moving the reflector 33 rearwardly.

The FIGURE 15 construction is similar to that of FIGURES 12 and 13 but differs in that the support plate 192 is omitted and the elastic diaphragm 260 is replaced by a flexible metal bellows generally referred to by the numeral 290 comprising inner and outer concentric bellows sections 292, 294, respectively each having a plurality of accordion pleats or folds and connected as by brazing to a common ring-like end plate 296. It will be understood that these three parts may if desired be made from a lesser number of sections if desired so that different extents of flexibility may be imparted to the two bellows. The outer bellows 292 has an outward turned flange 298 at its inner end lapping over the forward end face of the frame 186 and to which it is preferably secured as by brazing to assure a fluid tight connection. Moreover, a stop or abutment 300 associated with the mirror assembly support is provided adjacent the rearward end of the bellows 294 to permit further compression loading of this bellows when the reflector is drawn rearwardly to its extinct position by the wire or cable 286 which is connected to a ring plate 302 suitably bonded in any of the ways previously described to the rear face of the reflector 33 and to the outwardly turned inner flange 306 of the bellows 294. Obviously the window plate will be sealed against the flange 298 of the bellows 292 by the seal 194 under compression by the compression ring 188.

In operation of this embodiment the bellows will normally be under some compression so as to hold the reflector 33 in its forward position and atmospheric pressure will act on plate 296 and bellows 292 to keep the fluid in equilibrium. Upon moving the reflector 33 rearwardly to its extinct position the bellows 294 will be further compressed to build up the force necessary for its return movement and any changes in volume of the chamber 200 required by displacement of fluid 29 or by the bellows 294 will be compensated for by a corresponding in or out movement of the bellows 292. Atmospheric pressure acting on the wall 296 will prevent any liquid cavitation.

The embodiment in FIGURE 16 is similar to that of FIGURES 12 and 13 with this difference that in FIGURE 16 the diaphragm 190a is of thin spring metal, the support plate 192 is omitted, the reflector operating plate 196 provided with a loop connection for the pull cable or wire 286 and no return spring 244 is required, it being intended that the metal diaphragm 206 will have sufficient spring between the front and rear portions 206 and 212 to bias the reflector to its forward position and maintain it there until pulled to its extinct position by the wire 286. Also the wall 206 of the diaphragm will have sufficient flexibility to bow outwardly under fluid pressure or inwardly under atmospheric pressure in response to differences in volume of the fluid by temperature changes or any tendency toward cavitation. It will be understood that the forward wall 212 of the diaphragm and the pull plate 196 will be bonded to the reflector in any of the ways previously described and that the rear wall 206 of the diaphragm may be either brazed to the frame 186 or a second seal 194 be provided between it and the frame 186 and held under compression by the ring 188.

The structures of FIGURES 15 and 16 may be suitably mounted in well known ways to pedestals such as 12 or 184 rigid or adjustable.

In FIGURES 17 and 18 is a modification applicable to any of the previously described arrangements especially featuring a further means for indexing the spacing of the reflector 33 and window 26 in the forward or bright position of the reflector. As there shown a thin ring 310 is sandwiched between the window 26 and annular wall of the casing of any of the constructions described above. This ring is preferably made of a hard brass of the exact thickness of the gap desired between the window and reflector. As shown it is preferably provided with a scalloped inner edge or periphery 312 forming alternate valleys 314 and projections or tabs 316. Preferably at least three projections equally spaced will be provided. It will be observed that the projections 316 extend inwardly intermediate the window 26 and reflector 33 to provide the required indexing while the valleys 314 extend outwardly to at least the periphery of the liquid chamber so that fluid masses pass from the reservoir through the annular passage 42 and valleys 314 to between the window and reflector when the latter is shifted backwardly and out from between the window and reflector when moved forwardly. In order to avoid any reflection from the projections 316 the plate 310 is preferably given a satin nickel finish. The construction in FIGURES 17 and 18 also differs somewhat in the seal arrangement for the fluid casing, there being two O-ring seals 318, 320 provided, one between the forward inturned flange 324 of the annular retaining member 326 and the window 26 and the other between the rearward inturned flange 328 of the member 326 and the casing 330.

Although no specific method of filling the fluid chambers of the various structures described above has been described it will be understood that any of several procedures may be followed. According to one method, the parts of the mirror assembly will be assembled in the fluid using suitable temporary clamping means to establish the seals and subsequently completing any work on the compression rings. Alternatively, a pair of small openings may be provided through the frame or casing members at diametrically opposite portions and one be used for filling by injection and the other for drawing off any air. Both holes will subsequently be suitably sealed by plugs.

It should also be understood that while the foregoing structures have been especially shown and described with reference to their utilization for outside side mirror applications that such is for illustration only and that the structures shown and described may be applied to many different applications, for example as an inside rear view mirror, and that operation of the reflector 33 may be effected in ways other than those specifically described.

Various changes and modifications will readily suggest themselves to those skilled in the art without departing from the spirit and intent of the invention as shown and described and all such changes, modifications, equivalents, and departures as may come within the purview of the appended claims are contemplated.

We claim:

1. A mirror structure comprising an enclosure, a substantially transparent first plate carried by said enclosure and forming a window therefor, said first plate having a light reflecting frontal face of relatively low light reflectivity and having a rearward face within said enclosure, said enclosure defining a fluid chamber for receiving an optically dense light attenuating fluid, a second plate within said enclosure to be submerged in said fluid, said second plate having a mirrored light reflecting surface of relatively high light reflectivity confronting said rearward face of said first plate, a metal member of relatively high magnetic permeability, a plurality of spring fingers connecting with said metal member and positioning said metal member on the side of said second plate most remote from said first plate, the outer terminal portions of said fingers being secured to edge portions of said second plate, resilient means in engagement with said second plate biasing said second plate into a first position in juxtaposition to said first plate in which position said mirrored surface provides light reflectivity of the greatest intensity, and electromagnetic means carried by said enclosure operable upon said metal member in response to energization of this means to draw said second plate to a second position in which said second plate is displaced outwardly from its said juxtaposed position relative to said first plate and in which second position said first plate provides light reflectivity of the greatest intensity and said fluid provides a masking layer between said plates substantially extinguishing light reflections by said mirrored surface of said second plate whereby a combination of reflections from said second plate acting with light reflections from said first plate to produce multiple images is avoided.

2. A mirror structure comprising an enclosure, a substantially transparent first plate carried by said enclosure and forming a window therefor, said first plate having a light reflecting frontal face of relatively low light reflectivity and having a rearward face within said enclosure, said enclosure defining a fluid chamber for receiving an optically dense light attenuating fluid, a second plate within said enclosure to be submerged in said fluid, said second plate having a mirrored light reflecting surface of relatively high light reflectivity confronting said rearward face of said first plate, a metal member of relatively high magnetic permeability, resilient means providing a lost motion connection between said metal member and said second plate on the side of the latter most remote from said first plate, resilient means in engagement with said second plate biasing said second plate into a first position in juxtaposition to said first plate in which position said mirrored surface provides light reflectivity of the greatest intensity, and electromagnetic means carried by said enclosure operable upon said metal member in response to energization of this means to draw said second plate to a second position in which said second plate is displaced outwardly from its said juxtaposed position relative to said first plate and in which second position said first plate provides light reflectivity of the greatest intensity and said fluid provides a masking layer between said plates substantially extinguishing light reflections by said mirrored surface of said second plate.

3. A mirror structure comprising an enclosure, a substantially transparent first plate carried by said enclosure and forming a window therefor, said first plate having a light reflecting frontal face of relatively low light reflectivity and having a rearward face within said enclosure, said enclosure defining a fluid chamber for receiving an optically dense light attenuating fluid, a second plate within said enclosure to be submerged in said fluid, said second plate having a mirrored light reflecting surface of relatively high light reflectivity confronting said rearward face of said first plate, a metal member of relatively high magnetic permeability secured to the side of said second plate most remote from said first plate, said member having a rearward projection forming a movable core member of an electrical solenoid and extending through said enclosure, a solenoid surrounding said movable core member and including a stationary core member of similar metal to said movable core member and coaxial with the latter, resilient means biasing said second plate into a first position in juxtaposition to said first plate in which position said mirrored surface provides light reflectivity of the greatest intensity, said resilient means also biasing said movable core member into spaced relationship relative to said stationary core member, said solenoid when energized being operable to draw said movable core member toward said stationary core member and thereby move said second plate to a second position in which said second plate is displaced outwardly from its said juxtaposed position relative to said first plate and in which second position said first plate provides light reflectivity of the greatest intensity and said fluid provides a masking layer between said plates substantially extinguishing light reflections by said mirrored surface of said second plate, and a fluid passage interconnecting said fluid chamber and said space between said movable and stationary core member.

4. A mirror structure comprising an enclosure, a substantially transparent first plate carried by said enclosure and forming a window therefor, said first plate having a light reflecting frontal face of relatively low light reflectivity and having a rearward face within said enclosure, said enclosure defining a fluid chamber for receiving an optically dense light attenuating fluid, a second plate within said enclosure to be submerged in said fluid, said second plate having a light reflecting face of relatively high light reflectivity confronting said rearward face of said first plate, a ring-like member carried by said enclosure and having a plurality of circumferentially spaced inwardly projecting relatively thin flat fingers, said fingers projecting inwardly into said fluid chamber beyond the periphery of said second plate and lying in abutment with said rearward face of said first plate, said fingers determining recesses between them having their bottoms outwardly beyond the periphery of said second plate, resilient means biasing said second plate forwardly against said fingers, said recesses forming passage means for displacing fluid in front of said second plate to behind said second plate as an incident to said biasing movement of said second plate and means operable upon said second plate to displace said second plate rearwardly of its said position in abutment with said fingers and in which second position said first plate provides light reflectivity of the greatest intensity and said fluid provides a masking layer between said plates substantially inhibiting light reflections by said light reflecting face of said second plate.

5. A mirror structure comprising an enclosure including a substantially transparent first plate forming a window and forward wall therefor, said first plate having a light reflecting frontal face of relatively low light reflectivity and having a rearward face within said enclosure, and casing means providing peripheral and end walls for said enclosure, said enclosure defining a fluid chamber for receiving an optically dense light attenuating fluid, a second plate within said enclosure and movable in the fluid therein toward and away from said first plate, said second plate having a light reflecting face of relatively high light reflectivity confronting said rearward face of said first plate, said second plate having a rearward side, said casing means comprising a rigid open frame member and a preshaped resilient metallic element having spaced wall portions connected by an inner lip defining an aperture, one of said wall portions connecting with said frame member and the other being secured to said rearward side of said second plate and supporting said second plate in said fluid chamber, said resilient element urging said second plate into a first position in juxtaposition with said first plate in which position said light reflecting face of said second plate provides light reflectivity of the greatest intensity, and means secured to said rearward side of said second plate for actuating said second plate to a second position displaced outwardly from its said juxtaposed position relative to said first plate and in which position said first plate provides light reflectivity of the greatest intensity and said fluid provides a masking layer between said plates substantially inhibiting light reflections by said light reflecting face of said second plate.

6. A mirror structure comprising an enclosure, a transparent first plate forming a window for said enclosure, said plate having a light reflecting frontal face of relatively low light reflectivity and having a rearward face within said enclosure, said enclosure defining a closed fluid chamber for receiving an optically dense light attenuating fluid, a second plate within said enclosure having a light reflecting face of relatively high light reflectivity confronting said rearward face of said first plate, said plates being movable toward and away from each other, and plate shifting means operable to position said plates in a first position in which said light reflecting face of said second plate provides light reflectivity of the greatest intensity and in a second position in which said light reflecting face of said first plate provides light reflectivity of the greatest intensity and said fluid provides a masking layer between said plates substantially inhibiting light reflections by said light reflecting face of said second plate, said enclosure including a ring-like flexible bellows defined by inner and outer convoluted portions, the forward end of said outer portion forming a fluid seal with said first plate, the forward end of said inner portion forming a fluid seal with said second plate, and the rearward ends of said inner and outer portions being connected by a wall, and said inner convoluted portion forming part of said plate shifting means.

7. A mirror structure comprising an enclosure, a transparent first plate forming a window for said enclosure, said plate having a light reflecting frontal face of relatively low light reflectivity and having a rearward face within said enclosure, said enclosure defining a closed fluid chamber for receiving an optically dense light attenuating fluid, a second plate within said enclosure having a light reflecting face of relatively high light reflectivity confronting said rearward face of said first plate, said plates being movable toward and away from each other, and plate shifting means operable to position said plates in a first position in which said light reflecting face of said second plate provides light reflectivity of the greatest intensity and in a second position in which said light reflecting face of said first plate provides light reflectivity of the greatest intensity and said fluid provides a masking layer between said plates substantially inhibiting light reflections by said light reflecting face of said second plate, said enclosure including a first flexible bellows forming part of said plate shifting means and normally operable to urge said second plate to said first position, said bellow having one end opening into said fluid chamber, and said enclosure including a second flexible bellows having one end opening into said fluid chamber, said second bellows being responsive to changes in fluid and chamber volume in said enclosure.

8. A mirror structure comprising an enclosure defining a closed fluid chamber for receiving an optically dense light attenuating fluid, said enclosure including a rigid open frame member defining a peripheral wall for the fluid chamber, a transparent first plate in fixed fluid sealing connection with one side of said frame and closing said side, said first plate forming a window for said fluid chamber and having a light reflecting frontal face of relatively low light reflectivity and having a rearward face within said chamber, said enclosure also having a movable wall comprising a second plate movable in said fluid and a flexible preshaped member of elastomeric material, which together close the opposite side of said frame, said second plate having a light reflecting face of relatively high light reflectivity confronting said rearward face of said first plate, and said elastomeric member having a central portion in fluid sealing connection with the side of said second plate most remote from said rearward face of said first plate and having an outer portion in fluid sealing connection with said frame member, a mounting plate for said mirror structure in abutment with said frame member and overlying said outer portion of said elastomeric member, said mounting plate having a central opening, retaining means for retaining said first plate and said mounting plate to said frame member, resilient means operable between said mounting plate and said second plate for biasing said second plate into a first position in juxtaposition with said first plate in which position said light reflecting face of said second plate provides light reflectivity of the greatest intensity, and actuating means in connection with said second plate and extending through said opening in said mounting plate for moving said second plate to a second position spaced rearwardly of said juxtaposed position in which second position said light reflecting face of said first plate provides light reflectivity of the greatest intensity and said fluid provides a masking layer between said first and second plates substantially inhibiting light reflections by said light reflecting face of said second plate.

9. A mirror structure as in claim 8, including means for supporting said fluid structure comprising a mounting bracket, providing a passage for said actuating means.

10. A mirror structure as in claim 9, wherein said bracket includes a spherical headed member received in a depression in said mounting bracket and providing a universal connection therewith, cable means for adjusting said mirror structure in a plurality of positions on said spherical headed member and wherein said actuating means comprises a cable.

11. A mirror structure comprising an enclosure, a transparent first plate forming a window for said enclosure, said plate having a light reflecting frontal face of relatively low light reflectivity and having a rearward face within said enclosure, said enclosure defining a closed fluid chamber for receiving an optically dense light attenuating fluid, a second plate within said enclosure having a light reflecting face of relatively high light reflectivity confronting said rearward face of said first plate, said plates being movable toward and away from each other and said second plate being arranged and constructed to permit this plate to substantially freely orient itself relative to said first plate to establish a condition of substantial parallelism between the confronting faces of said plates when said plates are moved into substantial abutment with each other, and shifting means operable to position said plates in a first position of substantial abutment in which the confronting faces of said plates are in substantial parallelism and less than about 0.010 inch apart whereby said light reflecting face of said second plate provides light reflectivity of the greatest intensity and in a second position in which the confronting faces of said plates are free of any requirement of parallelism and said plates are separated an amount more than 0.010 inch and sufficient to have said fluid provide a masking layer between said plates substantially extinguishing light reflections by said light reflecting face of said second plate whereby said light reflecting face of said first plate provides light reflectivity of the greatest intensity and whereby a combination of light reflections from said second plate acting with light reflections from said first plate to produce multiple images is avoided.

12. A mirror structure comprising an enclosure, a transparent first plate forming a window for said enclosure, said plate having a light reflecting frontal face of relatively low light reflectivity and having a rearward face within said enclosure, said enclosure defining a closed fluid chamber for receiving an optically dense light attenuating fluid, a second plate within said enclosure having a light reflecting face of relatively high light reflectivity confronting said rearward face of said first plate, said second plate having its periphery free of operable connection with said enclosure, said plates being movable toward and away from each other and said second plate being arranged and constructed to permit this plate to substantially freely orient itself relative to said first plate to establish a condition of substantial parallelism between the confronting faces of said plates when said second plate is in substantial abutment with said first plate, and plate shifting means operable to position said plates in a first position of substantial abutment in which the confronting faces of said plates are in substantial parallelism and less than about 0.010 inch apart whereby said light reflecting face of said second plate provides light reflectivity of the greatest intensity and in a second position in which the confronting faces of said plates are free of any requirement of parallelism and said plates are less than 0.625 inch apart but are separated an amount more than 0.010 inch and sufficient to have said fluid provide a masking layer between said plates substantially extinguishing light reflection by said light reflecting face of said second plate whereby said light reflecting face of said first plate provides a light reflectivity of the greatest intensity and whereby a combination of light reflections from said second plate acting with light reflections from said first plate to produce multiple images is avoided.

13. A mirror structure comprising an enclosure, a transparent first plate forming a window for said enclosure, said plate having a light reflecting frontal face of relatively low light reflectivity and having a rearward face within said enclosure, said enclosure defining a closed fluid chamber containing an optically dense light attenuating fluid, a second plate within said enclosure and submerged in said fluid, said second plate having a light reflecting face of relatively high light reflectivity confronting said rearward face of said first plate, said second plate being movable in said fluid toward and away from said first plate and said second plate being arranged and constructed to permit this plate to substantially freely orient itself in said fluid relative to said first plate to establish a condition of substantial parallelism between the confronting faces of said plates when said second plate is moved into substantial abutment with said first plate, means normally positioning said second plate in a first position of substantial abutment with said first plate in which the confronting faces of said plates are in substantial parallelism and less than 0.010 inch apart and in which position fluid is displaced from between said plates and said light reflecting face of said second plate provides light reflectivity of the greatest intensity, and means for displacing said second plate outwardly from its said first position to a second position free of any requirement of parallelism between said confronting faces and in which second position said confronting faces are separated an amount greater than 0.010 inch but less than 0.625 inch and said fluid fills the space between said plates and provides a masking layer between said confronting faces substantially extinguishing light reflections by said light reflecting face of said second plate whereby said light reflecting face of said first plate provides light reflectivity of the greatest intensity and whereby a combination of reflections from said second plate acting with light reflections from said first plate to produce multiple images is avoided, said light reflecting frontal face having a light reflecting intensity which is in the order of about 4% and less of the light incident thereon and said light reflecting face of said second plate in said substantially abutting position having a light reflecting intensity which is in the order of 25% and more of the light incident thereon.

14. A mirror structure comprising an enclosure, a transparent first plate forming a window for said enclosure, said plate having a light reflecting frontal face of relatively low light reflectivity and having a rearward face within said enclosure, said enclosure defining a closed fluid chamber containing an optically dense light attenuating fluid, a second plate submerged within said fluid within said enclosure, said second plate having a light reflecting face of relatively high light reflectivity confronting said rearward face of said first plate and having a peripheral portion freely slidable in said enclosure so as to be universally adjustable in relation to said first plate to facilitate establishmen of a condition of substantial parallelism between said confronting faces when said plates are moved into substantial abutment, said second plate being movable in said fluid toward and away from said first plate, means normally positioning said second plate in a first position of substantial abutment with said first plate in which the confronting faces of said plates are in substantial parallelism and less than 0.010 inch apart and in which position fluid is displaced from between said plates and said reflecting face of said second plate provides light reflectivity of the greatest intensity, and means for displacing said second plate outwardly from its said first position to a position free of any requirement of parallelism between said confronting faces and in which second position said confronting faces are separated in an amount greater than 0.010 inch but less than 0.625 inch and said fluid fills the space between said faces and provides a masking layer between said faces substantially extinguishing light reflection by said light reflecting face of said second plate whereby said light reflecting face of said first plate provides light reflectivity of the greatest intensity and whereby a combination of reflections from said second plate acting with light reflections from said first plate to produce multiple images is avoided.

15. A mirror structure comprising an enclosure, a transparent first plate forming a window for said enclosure, said plate having a light reflecting frontal face of relatively low light reflectivity and having a rearward face within said enclosure, said enclosure defining a closed fluid chamber containing an optically dense light attenuating fluid, a second plate submerged within said fluid, said second plate having a light reflecting face of relatively high light reflectivity confronting said rearward face of said first plate and having a peripheral portion freely slidable in said enclosure so as to be universally adjustable in relation to said first plate to facilitate establishment of a condition of substantial parallelism between said confronting faces when said pates are moved into substantial abutment, said second plate being movable in said fluid toward and away from said first plate, means normally biasing said second plate into substantial abutment with said first plate in which position said confronting faces are in substantial parallelism and less than 0.010 inch apart and in which position fluid is displaced from between said plates and said light reflecting face of said second plate provides light reflectivity of the greatest intensity, and shift means for moving said second plate outwardly from its said position of susbtantial abutment relative to said first plate to a second position free of any requirement of parallelism between said confronting faces and in which second position said faces are separated an amount greater than 0.010 inch but less than 0.625 inch and said fluid fills the space between said plates and provides a masking layer between said confronting faces substantially inhibiting light reflection by said light reflecting face of said second plate whereby said light reflecting face of said first plate provides light reflectivity of the greatest intensity and whereby a combination of reflections from said second plate acting with light reflections from said first plate to produce multiple images is avoided.

16. A mirror structure comprising an enclosure, a transparent first plate forming a window for said enclosure, said plate having a light reflecting frontal face of relatively low light reflectivity and having a rearward face within said enclosure, said enclosure defining a closed fluid chamber containing an optically dense light attenuating fluid, a second plate submerged within said fluid, said second plate having a light reflecting face of relatively high light reflectivity confronting said rearward face of said first plate and having a peripheral portion freely slidable in said enclosure so as to be universally adjustable in relation to said first plate to facilitate establishment of a condition of substantial parallelism between said confronting faces when said plates are moved into substantial abutment, said second plate being movable in said fluid toward and away from said first plate, means normally biasing said second plate into substantial abutment with said first plate in which position said confronting faces are in substantial parallelism and less than 0.010 inch apart and in which position fluid is displaced from between said plates and said light reflecting face of said second plate provides light reflectivity of the greatest intensity, and shift means for moving said second plate outwardly from its said position of substantial abutment relative to said first plate to a second position free of any requirement of parallelism between said confronting faces and in which second position said faces are separated an amount greater than 0.010 inch but less than 0.625 inch and said fluid fills the space between said plates and provides a masking layer between said confronting faces substantially inhibiting light reflection by said light reflecting face of said second plate whereby said light reflecting face of said first plate provides light reflectivity of the greatest intensity and whereby a combination of reflections from said second plate acting with light reflections from said first plate to produce multiple images is avoided, and fluid passage means providing fluid communication from behind said second plate to between said plates.

17. A mirror structure comprising an enclosure, a transparent first plate forming a window for said enclosure, said plate having a light reflecting frontal face of relatively low light reflectivity and having a rearward face within said enclosure, said enclosure defining a closed fluid chamber containing an optically dense light attenuating fluid, a second plate within said enclosure and submerged in said fluid, said second plate having a light reflecting face of relatively high light reflectivity confronting said rearward face of said first plate, said second plate being movable in said fluid toward and away from said first plate and said second plate being arranged and constructed to permit this plate to substantially freely orient itself relative to said first plate to establish a condition of substantial parallelism between the confronting faces of said plates when said second plate is moved into substantial abutment with said first plate, means normally positioning said second plate in a first position of substantial abutment with said first plate in which the confronting faces of said plates are in substantial parallelism and less than about 0.010 inch apart and in which position fluid is displaced from between said plates and said light reflecting face of said second plate provides light reflectivity of the greatest intensity, means for displacing said second plate outwardly from its said first position to a second position free of any requirement of parallelism and in which second position said confronting faces are separated an amount greater than 0.010 inch but less than 0.625 inch and said fluid fills the space between said plates and provides a masking layer between said plates substantially inhibiting light reflectivity by said light reflecting face of said second plate whereby said light reflecting face of said first plate provides light reflectivity of the greatest intensity and whereby a combination of reflections from said second plate acting with light reflections from said first plate to produce multiple images is avoided, and indexing means on at least one of said plates and operable to abut the other plate in said first position of said second plate whereby to provide predetermined spacing and substantial parallelism between said confronting faces in said first position.

18. A mirror structure comprising an enclosure, a transparent first plate forming a window for said enclosure, said plate having a light reflecting frontal face of relatively low light reflectivity and having a rearward face within said enclosure, said enclosure defining a closed fluid chamber for receiving an optically dense light attenuated fluid, a second plate within said enclosure having a light reflecting face of relatively high light reflectivity confronting said rearward face of said first plate, said plates being movable toward and away from each other and said second plate being arranged and constructed to permit this plate to substantially freely orient itself relative to said first plate to establish a condition of substantial parallelism between the confronting faces of said plates when said second plate is moved into substantial abutment with said first plate, and shift means operable to position said plates in a first position of substantial abutment in which the confronting faces of said plates are in substantial parallelism and less than about 0.010 inch apart whereby said light reflecting face of said second plate provides light reflectivity of the greatest intensity and in a second position in which the confronting face of said plates are free of any requirement of parallelism and said plates are separated an amount more than 0.010 inch and sufficient to have said fluid provide a masking layer between said plates substantially extinguishing light reflections by said light reflecting face of said second plate whereby said light reflecting face of said first plate provides light reflectivity of the greatest intensity and whereby a combination of light reflections from said second plate acting with light reflections from said first plate to produce multiple images is avoided, and said enclosure including means for varying the fluid volume of said fluid chamber in response to temperature changes in said fluid.

19. A mirror structure comprising an enclosure, a transparent first plate forming a window for said enclosure, said plate having a light reflecting frontal face of relatively low light reflectivity and having a rearward face within said enclosure, said enclosure defining a closed fluid chamber, an optically dense light attenuating fluid in said chamber, a second plate within said enclosure submerged in said fluid, said second plate having a light reflecting face of relatively high light reflectivity confronting said rearward face of said window plate, said second plate being arranged and constructed to permit this plate to substantially freely orient itself relative to said first plate to establish a condition of substantial parallelism between the confronting faces of said plates when said second plate is in substantial abutment with said first plate, plate shifting means operable to position said plates in a first position in which said last two mentioned faces of said plates are in substantial abutment and in substantial parallelism and separated by a relatively thin film in the order of .002 inch and less of said fluid through which light from said window may pass to said second plate and be reflected by said light reflecting face of said second plate out of said window and said second plate provides light reflectivity of the greatest intensity, said shifting means being also operable to position said plates in a second position in which the confronting faces of said plates are free of any requirement of parallelism and in which said confronting faces are displaced outwardly from their said first position and are separated by a layer of said fluid in the order of 0.250 inch and less sufficient to mask said light reflecting face of said second plate and substantially extinguish light reflections therefrom whereby said light reflecting face of said first plate provides light reflectivity of the greatest intensity and whereby a combination of reflections from said second plate acting with light reflections from said first plate to produce multiple images is avoided.

20. A mirror structure comprising an enclosure, a substantially transparent first plate carried by said enclosure and forming a window therefor, said first plate having a light reflecting frontal face of relatively low light reflectivity and having a rearward face within said enclosure, said enclosure defining a fluid chamber for receiving an optically dense light attenuating fluid, a second plate within said enclosure to be submerged in said fluid, said second plate having a mirrored light reflecting surface of relatively high light reflectivity confronting said rearward face of said first plate, a metal member of relatively high magnetic permeability secured to the side of said second plate most remote from said first plate, said second plate being arranged and constructed to permit this plate to substantially freely orient itself relative to said first plate to establish a condition of substantial parallelism between the confronting faces of said plates when said second plate is moved into substantial abutment with said first plate, resilient means in engagement with said second plate and biasing said second plate into a first position of substantial abutment relative to said first plate in which position the confronting faces of said plates are in substantial parallelism and whereby said mirrored surface provides light reflectivity of the greatest intensity and electromagnetic means carried by said enclosure operable upon said metal member in response to energization of this electromagnetic means to draw said second plate to a second position in which said second plate is displaced outwardly from its said position of substantial abutment relative to said first plate and in which second position said first plate provides light reflectivity of the greatest intensity and said fluid provides a masking layer between said confronting faces of said plates substantially extinguishing light reflections by said mirrored surface of said second plate whereby a combination of reflections from said second plate acting with light reflections from said first plate to produce multiple images is avoided.

21. A mirror structure comprising casing means, a first mirror carried by said casing means and providing a window therefor, said casing including a rear wall spaced from said first mirror, an optically dense light attenuating fluid in said casing, a second mirror within said casing intermediate said first mirror and said rear wall of said casing and submerged in said fluid and having its light reflecting face confronting said first mirror, resilient means biasing said second mirror into a position of substantial engagement with said first mirror in which position said second mirror provides light reflectivity of the greatest intensity, said resilient means comprising a substantially flat spring member operable between said rear wall of said casing and the rear surface of said second mirror, said spring member having a generally circular base portion and a plurality of radially extending spring fingers, and means operable to separate said mirrors to a second position in which position said first mirror provides light reflectivity of the greatest intensity and said fluid provides a masking layer for said second mirror substantially extinguishing light reflections therefrom whereby a combination of reflections from said second mirror acting with light reflections from said first mirror to produce multiple images is avoided.

22. A mirror structure comprising an enclosure including, a substantially transparent first plate forming a window and forward wall therefor, said first plate having a light reflecting frontal face of relatively low light reflectivity and having a rearward face within said enclosure, and casing means providing a peripheral wall and an end wall for said enclosure defining with said first plate a fluid chamber for receiving an optically dense light attenuating fluid, a second plate within said enclosure and movable in the fluid therein toward and away from said first plate, said second plate having a light reflecting face of relatively high light reflectivity confronting said rearward face of said first plate, said second plate having a rearward side, means secured to said second plate and located centrally of said rearward side thereof by which to effect said movement of said second plate, resilient means biasing said second plate into a first position in substantial abutment with said first plate in which position said light reflecting face of said second plate provides light reflectivity of the greatest intensity, said second plate being arranged and constructed to permit this plate to substantially freely orient itself relative to said first plate to establish a condition of substantial parallelism between the confronting faces of said plates when said second plate is moved into said first position and means carried by one of said end wall and said means secured to said second plate, for actuating said second plate to a second position displaced outwardly from its said first position relative to said first plate and in which second position said second plate is free of any requirement of parallelism relative to said first plate and said first plate provides light reflectivity of the greatest intensity and said fluid provides a masking layer between said plates substantially inhibiting light reflections by said light reflecting face of said second plate whereby a combination of reflections from said second plate acting with light reflections from said first plate to produce multiple images is avoided.

23. A mirror structure comprising an enclosure including a substantially transparent first plate forming a window and forward wall therefor, said first plate having a light reflecting frontal face of relatively low light reflectivity and having a rearward face within said enclosure, and casing means providing a peripheral wall and an end wall for said enclosure, said enclosure defining a fluid chamber for receiving an optically dense light attenuating fluid, a second plate within said enclosure and movable in the fluid therein toward and away from said first plate, said second plate having a light reflecting face of relatively high light reflectivity confronting said rearward face of said first plate, said second plate having a rearward side, actuator means secured to said rearward side and centrally of said rearward side by which to effect said movement of said second plate, resilient means biasing said second plate into a first position in juxtaposition with said first plate in which position said light reflecting face of said second plate provides light reflectivity of the greatest intensity, actuator operating means carried by one of said casing means and actuator means and operable upon said actuator means for actuating said second plate to a second position displaced outwardly from its said juxtaposed position relative to said first plate and in which position said first plate provides light reflectivity of the greatest intensity and said fluid provides a masking layer between said plates substantially inhibiting light reflections by said light reflecting face of said second plate, said casing means comprising a rigid open frame providing said peripheral wall for said enclosure and a preshaped elastomeric member providing said casing end wall for said enclosure, said elastomeric member having a central portion secured to said second plate and having its outer portion secured to said frame.

24. A mirror structure as claimed in claim 23 wherein said preshaped elastomeric member is of a synthetic rubber-like material insoluble in said fluid.

25. A mirror structure comprising an enclosure including a substantially transparent first plate forming a window and forward wall therefor, said first plate having a light reflecting frontal face of relatively low light reflectivity and having a rearward face within said enclosure, and casing means providing a peripheral wall and an end wall for said enclosure, said enclosure defining a fluid chamber for receiving an optically dense light attenuating fluid, a second plate within said enclosure movable in the fluid therein toward and away from said first plate, said second plate having a light reflecting face of relatively high light reflectivity confronting said rearward face of said first plate, said second plate having a rearward side, actuator means secured to said rearward side and centrally of said rearward side by which to effect said movement of said second plate, resilient means biasing said second plate into a first position in juxtaposition to said first plate in which position said light reflecting face of said second plate provides light reflectivity of the greatest intensity, actuator operating means carried by one of said casing means and actuator means and operable upon said actuator means for actuating said second plate to a second position displaced outwardly from its said juxtaposed position relative to said first plate and in which position said first plate provides light reflectivity of the greatest intensity and said fluid provides a masking layer between said plates substantially inhibiting light reflections by said light reflecting face of said second plate, said casing means comprising a rigid open frame providing said peripheral wall for said enclosure and a preshaped body of elastomeric material secured to said frame providing said casing end wall for said enclosure, said body having a lip like aperture defined by a forwardly extending and outwardly turned wall portion thereof secured to said second plate.

26. A mirror structure comprising an enclosure including a substantially transparent first plate forming a window and forward wall therefor, said first plate having a light reflecting frontal face of relatively low light reflectivity and having a rearward face within said enclosure, and casing means providing a peripheral wall and an end wall for said enclosure, said enclosure defining a fluid chamber for receiving an optically dense light attenuating fluid, a second plate within said enclosure and movable in the fluid therein toward and away from said first plate, said second plate having a light reflecting face of relatively high light reflectivity confronting said rearward face of said first plate, said second plate having a rearward side, actuator means secured to said rearward side and centrally of said rearward side by which to effect said movement of said second plate, resilient means biasing said second plate into a first position in juxtaposition to said first plate in which position said light reflecting face of said second plate provides light reflectivity of the greatest intensity, and actuator operating means carried by one of said casing means and actuator means and operable upon said actuator means for actuating said second plate to a second position displaced outwardly from its said juxtaposed position relative to said first plate and in which position said first plate provides light reflectivity of the greatest intensity and said fluid provides a masking layer between said plates substantially inhibiting light reflections by said light reflecting face of said second plate, said casing means comprising a rigid open frame providing said peripheral wall for said enclosure and a preshaped resilient element providing said casing end wall for said enclosure, said element having forward and rear spaced apart wall portions joined by a central lip defining an aperture exposing said actuator means, one of said spaced wall portions being secured to said frame and the other to said second plate.

27. A mirror structure as claimed in claim 26 wherein said preshaped resilient element is of resilient metal.

28. A mirror structure comprising an enclosure including a substantially transparent first plate forming a window and forward wall therefor, said first plate having a light reflecting frontal face of relatively low light reflectivity and having a rearward face within said enclosure, and casing means providing a peripheral wall and an end wall for said enclosure, said enclosure defining a fluid chamber for receiving an optically dense light attenuating fluid, a second plate within said enclosure and movable in the fluid therein toward and away from said first plate, said second plate having a light reflecting face of relatively high light reflectivity confronting said rearward face of said first plate, said second plate also having a rearward side, actuator means secured to said rearward side and centrally of said rearward side by which to effect said movement of said second plate, resilient means biasing said second plate into a first position in juxtaposition to said first plate in which position said light reflecting face of said second plate provides light reflectivity of the greatest intensity, actuator operating means carried by one of said casing means and actuator means and operable upon said actuator means for actuating said second plate to a second position displaced outwardly from its said juxtaposed position relative to said first plate and in which position said first plate provides light reflectivity of the greatest intensity and said fluid provides a masking layer between said plates substantially inhibiting light reflections by said light reflecting face of said second plate, said casing means comprising a rigid open frame providing said peripheral wall for said enclosure and a preshaped resilient element providing said casing end wall for said enclosure, said element having forward and rear spaced apart wall portions joined by a central lip defining an aperture exposing said actuator means, one of said spaced wall portions being secured to said frame and the other to said second plate, and a backing plate for said resilient element secured to said frame, said backing plate including a depression for receiving said resilient biasing means.

References Cited by the Examiner

UNITED STATES PATENTS

| | | |
|---|---|---|
| 1,195,757 | 8/16 | Wertz. |
| 1,234,333 | 7/17 | Heathcote. |
| 1,913,874 | 6/33 | Folberth et al. |
| 1,919,475 | 7/33 | McKinley _____ 88—77 |
| 2,437,642 | 3/48 | Henroteau. |
| 2,931,245 | 4/60 | Jacobson _____ 88—98 X |
| 3,000,262 | 9/61 | Rabinow et al. _____ 88—77 |

JEWELL H. PEDERSEN, *Primary Examiner.*